United States Patent Office 3,475,044
Patented Oct. 28, 1969

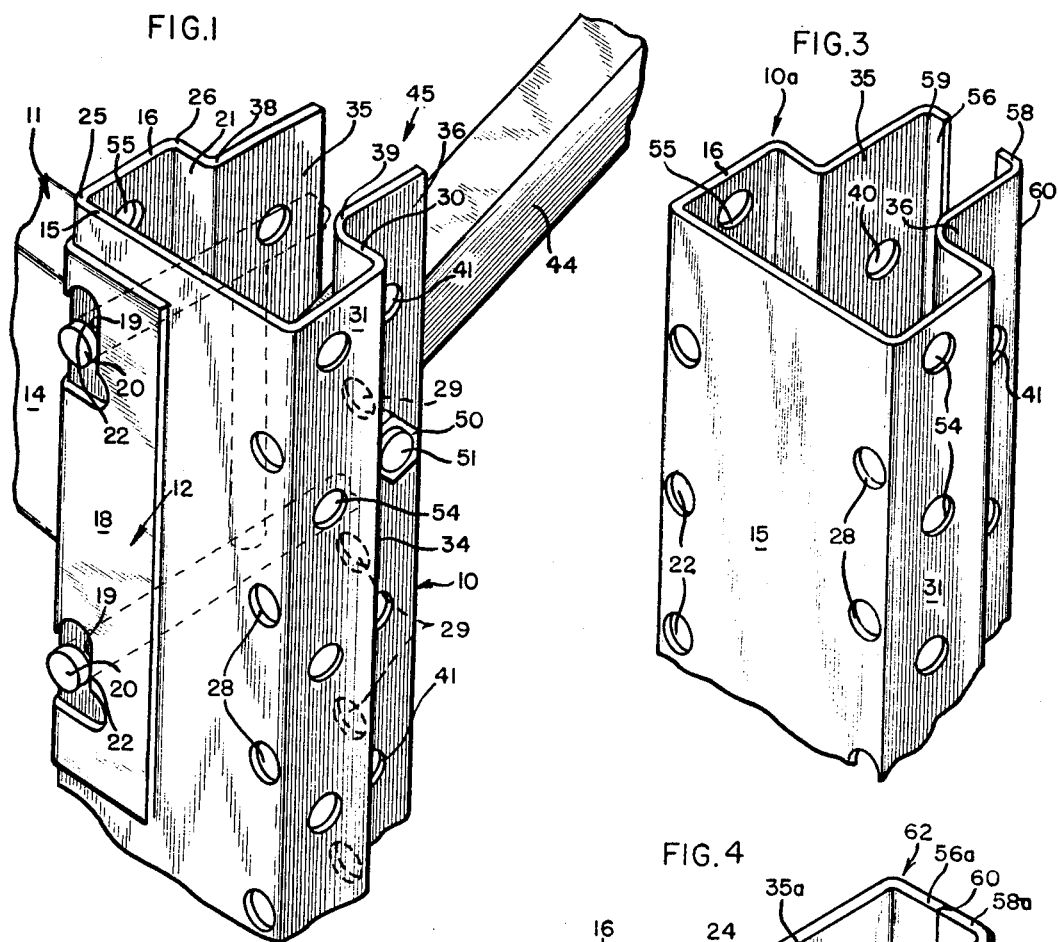

---

3,475,044
COLUMN STRUCTURE
Anthony N. Konstant, Mount Prospect, Ill., assignor to Speedrack Inc., Skokie, Ill., a corporation of Illinois
Filed Jan. 16, 1968, Ser. No. 698,240
Int. Cl. F16b *1/00, 7/00, 3/00, 5/00*
U.S. Cl. 287—189.36     4 Claims

ABSTRACT OF THE DISCLOSURE

A structural member having a substantially T-shaped cross section is provided with rows of preformed holes. In opposite sidewalls of the structural member defining a head portion for T-shaped cross section, rows of holes are aligned to receive a projecting fastener for releasably securing another structural member to the head portion. In a similar manner, opposite sidewalls defining a leg portion of said T-shaped cross section have rows of aligned preformed holes to receive a fastener for releasably fastening another structural member to the leg portion.

---

This invention relates to a structural member for readily assembled and disassembled structures, and more particularly to a structural member having preformed openings for receiving fastening devices.

The present invention is directed to a structural member for use in structures such as that disclosed in Schell, Patent No. 2,932,368 in which vertical columns of C-shaped cross section have preformed holes to receive locking pins to secure horizontal beams to the column. The locking pins are generally U-shaped with a pair of spaced pin members to fit into preformed openings on an angle plate secured to the beam and into alined openings in the column so that beams are secured to the columns without the use of special tools. In this structure, however, the horizontal braces and cross braces between columns are welded to the latter after being inserted into the open mouth of the C-shaped cross section columns. These columns, therefore, are readily releasable from the beams with removal of the locking pins but are not readily attached or detached from side braces. While eminently satisfactory for many installations, the C-shaped cross section members lack sufficient strength for heavier duty installations.

Accordingly, a general object of the invention is to provide a structural member for use in structures of the foregoing kind, but having a shape affording increased strength and affording areas for additional preformed openings to accept releasable fasteners to connect side braces or the like to the structural members.

A more specific object of the invention is to provide a structural member of T-shaped cross section with rows of longitudinally spaced apertures in opposite side walls to receive an elongated pin of a releasable fastener.

A further object of the invention is to provide a structural member of T-shaped cross section with alined rows of preformed openings in the head and leg portions, respectively, of the T section for receiving fasteners to releasably connect beams, side braces or the like.

Other objects and advantages of the invention will be apparent from the following description taken in connection with the accompanying drawings in which:

FIGURE 1 is a fragmentary, perspective view of a structural member embodying the novel features of the present invention and attached to a beam and cross brace;

FIGURE 2 is a plan view of the structural member of FIGURE 1 and a connected cross brace;

FIGURE 3 is a fragmentary, perspective view of a structural element constructed according to another embodiment of the invention;

FIGURE 4 is a fragmentary, perspective view of a structural element constructed according to a further embodiment of the invention.

As shown in the drawings for purposes of illustration, the invention is embodied in a structural member 10 which is an elongated tubular member adapted for use as a column in readily assembled and disassembled structures such as buildings, storage racks, storage bins or scaffolds. In such structures, the structural member is often employed as the vertical column to which is attached one or more horizontal beams such as the beam 11 (FIG. 1). In the present instance, and as fully disclosed in the aforementioned U.S. patent, an angle-iron shaped connector or attaching plate 12 is fixed to an end 14 of the beam and abutted against side walls 15 and 16 of the column. A leg 18 of the angle plate is formed with vertically spaced, L-shaped openings 19 to receive and cam against the ends of pins 20 of a locking pin of the kind disclosed in the aforementioned patent.

The locking pins 20 span the hollow interior of the beam 10 from the side wall 15 to a spaced, parallel longitudinally extending side wall 21, which is termed for reference purposes the fore-and-aft direction. Each of the side walls 15 and 21 has a plurality of longitudinally spaced, preformed apertures 22 and 24, respectively, which are transversely alined to receive the elongated pins 20 spanning the hollow interior of tubular column. The apertures are circular and are arranged in a longitudinal row or column adjacent the respective right angle corners 25 and 26 which extend longitudinally and join the parallel side walls 15 and 21 to the intermediate side wall 16. In a similar manner, preformed openings 28 and 29 are arranged in longitudinal rows in side walls 15 and 30, both of which are joined to opposite ends of a side wall 31 at right angled, longitudinally extending corners 32 and 34. The apertures 28 and 29 are disposed adjacent these corners and are transversely alined with each other to receive the pin members of a locking pin (not shown). The apertures 22, 24, 28 and 29 are alined in spaced horizontal planes normal to the member and the side walls 15, 16, 21, 30 and 31 constitute a C-shaped cross section portion which is generally similar to that shown in the aforementioned patent.

In accordance with the present invention, additional strength is provided by forming the beam in a T-shaped cross section with outwardly extending flanges 35 and 36 joined to the respective side walls 21 and 30 at right angled, longitudinally extending corners 38 and 39. Also, in accordance with the invention, additional rows of preformed openings 40 and 41 are provided in the respective flanges to facilitate the attachment of side or cross braces such as the cross brace 44. The flanges provide additional metal and strength to resist bending movements so that the columns may bear increased loads over the prior art C-shaped cross section columns.

In the embodiment of the invention of FIGURE 1, the flanges 35 and 36 are parallel to the side walls 16 and 31 and constitute a leg portion of T-shaped section of the beam, the walls 15, 16, 21, 30 and 31 defining a head portion of T-shaped cross section of the beam. A cross brace 44 may be inserted into a longitudinally extending groove 45 between the spaced flanges 35 and 36 and the flanges are connected to the cross beam by fasteners, such as the nut 50 and bolt 51 (FIG. 2), spanning a pair of the apertures 40 and 41 and extending through a suitable opening in the brace 44. The apertures 40 are formed in a longitudinally extending row in the flange 35 and the apertures 41 are alined in a similar row in the flange 31 with each aperture in one row being alined transversely with an aperture in the opposite row.

Other cross braces or beams (not shown) may be releasably secured to the column at an aperture 54 of a row of longitudinally spaced apertures in the side wall 31 or at an aperture 55 of a longitudinal row of apertures in the opposite parallel side wall 16. The apertures 54 and 55 are transversely alined to receive a shank of a bolt (not shown) for fastening a side brace to the side wall 16 or 31. Herein, the apertures 40, 41, 54 and 55 are alined in horizontal planes normal to the longitudinal axis of the column and these horizontal planes are disposed intermediate the horizontal planes for the apertures 22, 24, 28 and 29.

Additional beam strength may be obtained in the structural member 10a of the embodiment of invention shown in FIGURE 3 by providing inturned, facing flanges 56 and 58 integrally joined to the respective flanges 35 and 36 at right angle corners 59 and 60 which extend longitudinally of the tubular member. Except for the flanges 56 and 58 the structural member is identical to the structural member 10 of FIGURE 1 and identical reference characters identify the same elements in FIGURES 1–3.

In the embodiment of the invention shown in FIGURE 4, the flanges 35a and 36a are of a greater width than the similar flanges 35 and 36 on the columns shown in FIGURES 1 and 3. The inturned flanges 56a and 58a are abutted together at a longitudinal seam 60 and are welded at spaced locations along the seam to form a solid base wall 62 parallel to the side wall 15. In each of these embodiments, apertures 40 and 41 are formed in the respective flanges and apertures 54 and 55 may be formed in the respective side walls 31 and 16 to facilitate the attaching of a side brace or beam. The additional metal afforded by the wider walls 35a and 36a and the joining of the flanges 56a and 58a result in a stronger beam than that of the embodiments of FIGURES 1 and 3.

From the foregoing it will be seen that the structural members are constructed to afford considerable strength to support heavy loads and have preformed apertures arranged to facilitate their use in readily assembled and disassembled structures.

While a preferred embodiment has been shown in the drawings and described herein, it is not intended to limit the invention by such disclosure but, rather, it is intended to cover all modifications and alternative constructions coming within the spirit and scope of the invention.

It is claimed that:

1. In a structural unit, a column having a substantially T-shaped horizontal cross section which is formed by a plurality of longitudinally extending side walls that define a head portion and a leg portion, said leg portion being disposed substantially centrally of said head portion, a horizontal beam having an angle-iron connector which abuts against perpendicular adjoining side walls of said head portion, two of said head portion-defining side walls being parallel and having rows of vertically-spaced first holes which holes are aligned in a fore-and-aft direction, said connector having a pair of vertically spaced openings which are spaced apart the same distance as said first holes, a locking pin having a pair of spaced pin members for insertion through said openings in said connector and through said first holes in said head portion, two of said leg-defining side walls being parallel and containing rows of second holes which are vertically spaced and aligned with each other in a lateral direction, said two leg-defining side walls being spaced apart a predetermined distance and defining a longitudinally extending, open groove, a brace member inserted into said open groove and abutting opposite interior sides of said leg-defining walls, an opening in said brace member for registration with said second holes in said leg portion side walls, and a releasable fastener insertable through said last-mentioned opening and through said second holes for securing said brace member to said leg portion of said column.

2. A structural unit in accordance with claim 1 in which the one of said two head portion-defining side walls which has the rows of vertically spaced first holes is directly connected to and disposed at right angles to said leg-defining side walls, each of said rows of holes being disposed on opposite sides of the leg defining side walls.

3. A structural column comprising an elongated substantially tubular member formed of a plurality of vertical walls joined integrally together and extending longitudinally, said member having a substantially T-shaped horizontal cross section with said plurality of walls defining a cross head portion and a leg portion, a first pair of spaced, parallel first walls serving as the lateral ends of the cross head portion of the T-section, first rows of vertically spaced apertures with the apertures in one first wall each being transversely aligned with one of the apertures in the other first wall to receive an elongated fastening device which can be passed horizontally and laterally therethrough, a second pair of spaced, parallel walls in said head portion of said T-shaped cross section extending normal to and joined to the ends of the first pair of parallel walls, second rows of vertically spaced apertures in each of said second pair of walls, and a third pair of parallel spaced walls defining said leg portion and joined to a first pair of walls of said head portion at a position centrally of the latter, and third rows of vertically spaced holes formed in said third pair of parallel spaced walls for receiving fasteners to connect members to said leg portion.

4. A structural column in accordance with claim 3 in which said walls of said leg portion are spaced and define a longitudinal extending, open groove for receiving a member therebetween.

References Cited

UNITED STATES PATENTS

| | | | |
|---|---|---|---|
| 1,554,011 | 9/1925 | Lehman | 108—107 |
| 2,932,368 | 4/1960 | Schell | 287—189.36 |
| 3,018,900 | 1/1962 | Huet | 211—148 |
| 3,042,221 | 7/1962 | Rasmussen | 211—148 |
| 3,186,527 | 6/1965 | Konstant et al. | 211—148 X |
| 3,194,407 | 7/1965 | D'Altrui | 211—148 |

RAMON S. BRITTS, Primary Examiner

U.S. Cl. X.R.

211—148; 287—54